United States Patent [19]
DuFrene

[11] 3,796,514
[45] Mar. 12, 1974

[54] POWER TRANSMITTING MECHANISM
[75] Inventor: Clement O. DuFrene, Cottage Grove, Minn.
[73] Assignee: Gordon Rosenmeier, Little Falls, Minn. ; a part interest
[22] Filed: Mar. 9, 1972
[21] Appl. No.: 233,058

[52] U.S. Cl.................... 416/124, 416/169, 192/85
[51] Int. Cl. ............................................ B64c 11/48
[58] Field of Search ........... 416/169, 120, 124, 121, 416/156–158; 192/85 A, 85 AA

[56] References Cited
UNITED STATES PATENTS

| | | | |
|---|---|---|---|
| 1,771,654 | 7/1930 | Powell ................................. | 416/124 |
| 2,126,221 | 8/1938 | Sessums........................... | 416/124 X |
| 2,297,480 | 9/1942 | Kratzmann...................... | 192/85 A |
| 2,465,810 | 3/1949 | MacDonald et al. ............. | 192/85 A |
| 2,639,014 | 5/1953 | Munschauer .................... | 192/85 A |
| 2,665,082 | 1/1954 | Anderson......................... | 416/124 X |
| 2,803,149 | 8/1957 | Pringle............................ | 192/85 A |
| 3,232,350 | 2/1966 | Lorenz............................. | 416/157 |

Primary Examiner—Everette A. Powell, Jr.
Attorney, Agent, or Firm—Robert C. Baker

[57] ABSTRACT

Disclosed is a power transmitting mechanism having three main parts: a base annular structure rotatable about its axis, a rotatable secondary structure contiguous to the base structure, and a non-rotating stationary housing contiguous to at least one of the base and secondary structures. The secondary structure is optionally rotatable in common with the base structure.

One of the structures is identified as a master structure; and this structure includes hydraulic chamber means, hydraulically-responsive means having a wall in communication with that chamber means, and coupling means actuated by the hydraulically-responsive means. The coupling means is actuatable during continuous rotation of the base structure to interlock the secondary structure to the base structure for common rotation with the base structure. It is actuatable during continuous rotation of the base structure to disengage the secondary structure from the aforesaid interlocked condition. The stationary housing includes hydraulic conduit means extending therethrough with one end of the conduit in sealed communication with the hydraulic chamber of the master structure to permit transfer of hydraulic fluid through the conduit to or from the chamber of the master structure during rotation of the rotatable parts. The mechanism includes a hydraulic control switch means for moving hydraulic fluid through the conduit of the stationary housing to or from the chamber of the master structure. A flexible hydraulic conduit connection is provided between the control switch means and the conduit of said stationary housing. Equipped with propeller fins, the device is useful for fitting to the power shaft of water craft motors for propulsion.

11 Claims, 6 Drawing Figures

PATENTED MAR 12 1974 3,796,514

POWER TRANSMITTING MECHANISM

This invention relates to an improved power transmitting mechanism especially useful to change the effective motion or thrust of a rotating assembly without changing the speed of rotation of the main power shaft for the assembly. The invention more particularly relates to a new propulsion device incorporating the improved power transmitting mechanism and adapted to be mounted on the propeller power shaft of water craft.

There are occasions when a user of powered water craft, whether powered by an inboard or outboard motor, desires the maximum forward thrust of which his power plant and propeller assembly is capable, and other occasions when the user desires a bare minimum of effective forward thrust or movement for the water craft. While complex gearing and shifting mechanisms may be incorporated in a power train to permit one to realize a great variety of speeds of movement, the expense of such expedients serves as a substantial deterrent to rather universal adoption of the same. Further, the bulk of apparatus required for implementing such expedients makes such an approach impractical where maximum simplicity and lightness in weight are also desired for the propulsion device, such as, for example, an outboard motor of substantial power but simplified and economical design.

But to operate an outboard motor (or, for that matter, any power plant) at extremely slow speeds (as desired for trolling by fishermen) can sometimes present problems of engine fouling or unreliable performance, especially where the motor or engine lacks complex gearing but has the necessary horsepower to give the forward thrust required for waterskiers and the like.

This invention provides an extraordinarily simple power transmitting mechanism which may be fitted to the powered rotatable axis shaft or propeller shaft of an outboard (or inboard) motor to provide a means whereby the forward thrust imparted to a boat or other water craft may be greatly altered while maintaining a uniform rotation of the propeller power shaft itself. The power transmitting mechanism may be fitted to any suitable propeller power shaft of a power plant with relative ease and economy, without the necessity of making any special modifications to the power plant. No complex metal mechanical control linkages between the power transmitting mechanism and an operator control area or panel are needed.

Thus, the need to maintain such linkages in proper respective positions and in proper repair for reliable operation is capable of being totally obviated or avoided by practice of this invention. Nevertheless, the invention permits an operator at a control switch or device to effect substantial changes in power thrust from a rotating power shaft while maintaining the shaft at a uniform rate of rotation; and the invention does not interfere with the gaining of maximum power thrust from a rotating power or propeller shaft by increasing the rate of its rotation by increasing engine speed.

The improved power transmitting mechanism of this invention comprises two rotatable structures. One structure is a base annular structure having an axis of rotation. The base structure is adapted to be fitted to a powered rotatable axis shaft for continuous rotation with the shaft. The other rotatable structure is a secondary structure contiguous to the base structure and annularly encompassing the axis of rotation for the base structure. This secondary structure is optionally rotatable in common with the base structure.

One of these structures is characterized as a master structure. The master structure includes a hydraulic chamber means, a hydraulically-responsive means in communication with that chamber means, and coupling means actuated by the hydraulically-responsive means. The coupling means is actuatable during continuous rotation of the base annular structure to interlock the secondary structure to the base structure for common rotation with the base structure. It is actuatable during continuous rotation of the base annular structure to disengage the secondary structure from the aforesaid interlocked condition.

In addition, the power transmitting mechanism includes a non-rotating stationary housing contiguous to at least one of the aforenoted structures, either the base annular structure or the secondary structure, preferably contiguous to the base annular structure. The non-rotating stationary housing annularly encompasses the axis of rotation for the structures. This stationary housing includes hydraulic conduit means extending through it with one end of the conduit means in sealed communication with the hydraulic chamber means of the master structure (which preferably is the base annular structure) so as to permit transfer of hydraulic fluid through the stationary housing to and from the chamber means of the master structure during rotation of either or both the base annular structure and the secondary structure. In this way, hydraulic fluid is used to control the coupling means for interlocking and unlocking the secondary structure to the base structure.

A hydraulic control switch means is useful for the purpose of moving hydraulic fluid through the conduit means of the stationary housing to and from the hydraulic chamber means of the master structure. A closed hydraulic system is useful; and no special pump means is needed for feeding the hydraulic fluid into and out of the hydraulic chamber of the master structure. Hand pressure on the control switch is sufficient; the full effective hydraulic control of the mechanism is possible with only extremely small hydraulic fluid movement, even possibly as little as about a cubic centimeter or the like.

A flexible hydraulic conduit connection extends between the control switch means and the conduit means of the stationary housing. Generally, the entrance end of the conduit or passage within the stationary housing (that is, the end not in sealed communication with the hydraulic chamber of the master structure) is equipped with a fitting of some sort permitting easy attachment of a flexible hydraulic conduit or hose to it. Likewise, the hydraulic control switch means is equipped with such a fitting.

As applied to a device for mounting upon the propeller power shaft for a water craft engine or motor, it is the rotatable secondary structure which will almost invariably comprise a hub member equipped with propeller fins projecting radially therefrom. However, power transmitting mechanisms for the propulsion of water craft also suitably and preferably include a base annular structure having a hub member with propeller fins projecting radially therefrom.

A feature of the base annular structure of the mechanism is that it comprises a sleeve member; and this sleeve member is adapted to be snugly fitted over the propeller power shaft of an outboard motor and locked for rotation therewith as by a shear key. Preferably both the secondary structure and the stationary housing are, at least in part, radially contiguous (as distinguished from being axially contiguous) to the sleeve member of the base annular structure.

Further, the stationary housing suitably includes a second hydraulic conduit means extending through it; and the master structure includes a second or auxiliary conduit passage for hydraulic fluid. The auxiliary conduit passage for hydraulic fluid in the master structure forms a connection with the side of the hydraulically-responsive means opposite to that of the wall of that hydraulically-responsive means in communication with the chamber means of the master structure. The second hydraulic conduit means of the stationary housing is in sealed communication with the auxiliary conduit passage of the master structure to permit transfer of hydraulic fluid through the second hydraulic conduit means to and from the opposite side of the hydraulically-responsive means during rotation of either rotatable structure of the mechanism.

The invention will further be described with the aid of a drawing made a part hereof wherein:

FIG. 1 is a schematic cross-sectional view, partially broken away, of a propeller assembly incorporating the power transmitting mechanism of this invention, the cross-section being taken along the axis of the power shaft for the device;

FIGS. 2 and 3 are schematic cross-sectional veiws through the power transmitting mechanism taken on lines 2—2 and 3—3, respectively, of FIG. 1;

Figure 1:
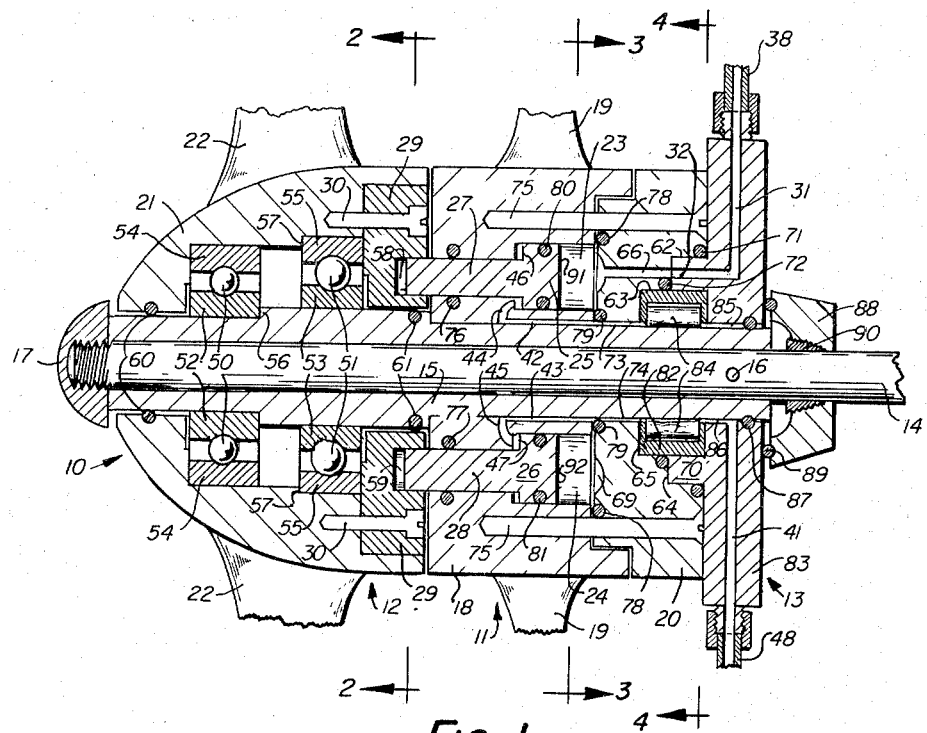
Figure 2:
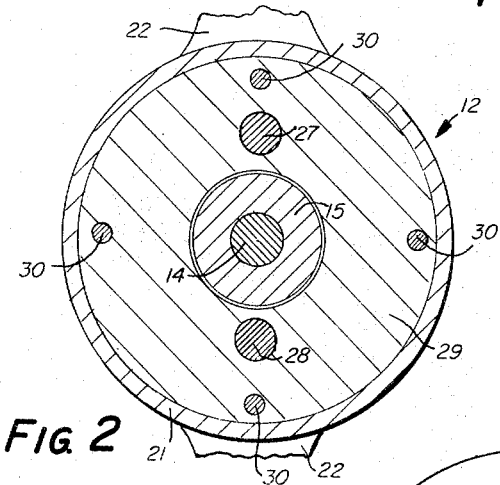

Referring to the drawing, the power transmitting mechanism 10 comprises three main parts: a base annular structure 11, a rotatable secondary structure 12, and a non-rotatable stationary housing 13.

The base annular structure 11 has an axis of rotation; that is, it rotates about an axis. It is adapted to be fitted to a powered rotatable axis shaft 14 for continuous rotation with shaft 14. A significant part of the base annular structure 11 is a sleeve member 15 which fits snugly upon the axis shaft 14 (or may be unitary therewith), and suitably is locked for rotation therewith by a shear pin 16. A threaded nut cap suitably may be threadly fastened on cooperative threads at the outer end of the axis shaft 14 to hold the sleeve 15 on shaft 14, even in the event of shear of the shear pin 16. As illustrated in the drawing, the base annular structure suitably includes a hub-like part 18 with radially outward propeller fins 19 projecting from the hub part 18, plus an adaptor fitting 20; but these parts will further by described hereinbelow.

The rotatable secondary structure 12 is contiguous to the base structure 11 and annularly encompasses the axis of rotation of the base structure. As shown in the drawing, the secondary structure is radially contiguous to the base structure 11, that is, annularly about it or the base sleeve part 15 of it. Optionally, an annular secondary structure 12 may be located axially contiguous to the base structure (or axially contiguous to most of the base structure). This secondary structure includes a hub-like part 21 with radially outward propeller fins 22 thereon. A feature of the secondary structure 12 is that it may be optionally rotated in common with the base structure 11; but it may be disengaged from such rotation in common with the base structure 11.

Figure 3:
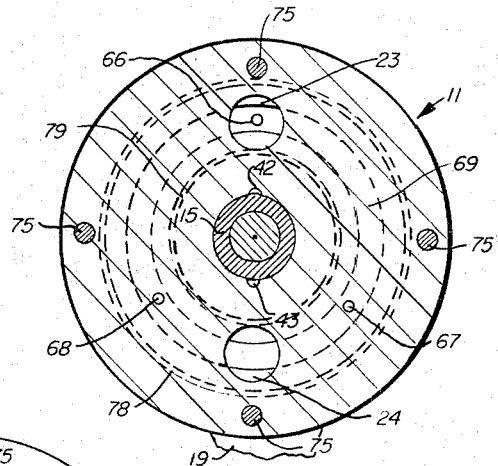

Either the rotatable base annular structure 11 or the rotatable secondary structure 12 is characterized as a master structure. As shown in FIG. 1, the base annular structure 11 is the master structure. The master structure includes a hydraulic chamber means 23 as a critical part thereof. This chamber 23 may take a variety of forms; and indeed, more than one hydraulic chamber means may be present. A second such chamber 24 is shown in FIGS. 1 and 3. Generally, at least two hydraulic chambers are employed, although the critical point is that at least one must be present. Optionally, even three or four or more may be present, with the most practical upper limit being not in excess of about four.

Within the hydraulic chamber means 23 and 24 of the master structure is a hydraulically-responsive means 25 and 26 having a wall 91 and 92 in communication with the chamber means 23 and 24 of that master structure. A practical hydraulically-responsive means 25 and 26 suitably consists of a piston-like member 25 and 26, or a diaphram like member, or any other suitable hydraulically moveable member capable of being displaced in response to hydraulic forces applied thereagainst.

A coupling means 27 and 28 is actuated by the hydraulically-responsive means 25 and 26; and this coupling means suitably may consist of a pin-like projection 27 and 28 from the hydraulically-responsive means or piston 25 and 26. The pin 27 and 28 may be quite large and resemble a shaft projection. It may be round, square, or otherwise in cross-sectional configuration transverse to its length. Optionally, the coupling means may comprise a gear structure for intermeshing with a gear of the coupled member; or the coupling means may take any suitable alternate form.

The coupling means 27 and 28 is actuatable during continuous rotation of the master or base structure 11 to effect an interlocking of the secondary structure 12 to the base structure 11 for common rotation with the base structure. Further, this coupling means or pin 27 or 28 is actuatable during continuous rotation of the master (or base) structure 11 for disengagement of the secondary structure 12 from the aforesaid interlocked condition. In the view shown in FIG. 1, a coupling means or pin 27 or 28 is shown in the substantially (but partially) interlocked condition with a block element 29 or part united to and part of the rotatable secondary structure 12. Screws 30 or other suitable fastening means may be employed to fix the annular block 29 to the hub-body 21 of the annular secondary structure 12, so that the block 29 is united to and rotates with the mass of the secondary structure.

The third main element of the power transmitting mechanism is the non-rotating stationary housing 13. This housing 13 is contiguous to at least one of the structures identified at the base annular structure 11 and rotatable secondary structure 12. It is preferably contiguous to the structure aforecharacterized as the master structure; but this is not critically necessary since hydraulic porting through an intermediate or separating structure between the master structure and the stationary housing may be employed where the two are separated. Stationary housing 13 preferably annularly encompasses the axis of rotation of the base annular structure 11. Indeed, the stationary housing 13 is usually radially contiguous and extends annular about a portion of the base annular structure 11, such as the sleeve 15 thereof.

A critical feature of the stationary housing 13 is that it includes a hydraulic conduit means 31 extending through it, with one end 32 of the conduit means in sealed communication with the hydraulic chamber means 23 and 24 of the master structure (e.g., the base annular structure). Suitably, the sealed communication may be through an intermediate adaptor fitting 20. The sealed communication permits transfer of hydraulic fluid through the conduit means 31 of the stationary housing 13 to and from the chamber means 23 and 24 of the master structure during rotation of the master structure. Indeed, this transfer of hydraulic fluid is possible during rotation of either or both of the structures identified as the base annular structure 11 and the rotatable secondary structure 12.

Figure 5:
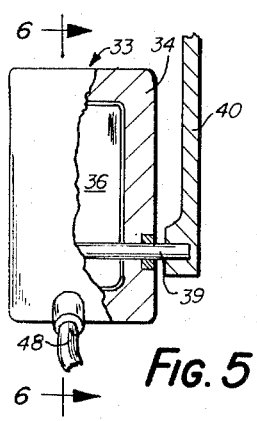
FIG. 5 is a schematic view, partially broken away, of a control switch means.
Figure 6:
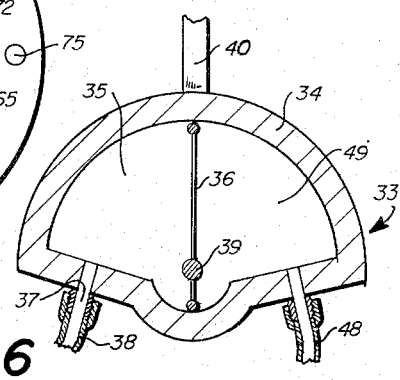
FIG. 6 is a schematic cross section taken on line 6—6 of FIG. 5.

Hydraulic control switch means 33, suitably as illustrated in FIGS. 5 and 6, permits an operator to move hydraulic fluid through the conduit means 31 of the stationary housing 13 to and from the chamber means 23 and 24 of the master structure 11. Illustratively, the switch may consist essentially of a housing member 34 having an internal hydraulic chamber 35 with a membrane or plate member 36 (or other suitable means such as a plunger) for moving hydraulic fluid in and out of the internal chamber 35 (that is, the left ventricle of the view in FIG. 6), through a nozzle fitting or other suitable fitting 37 to which a flexible hydraulic conduit or hose 38 is connected or fixed. Hydraulic fluid moves through hose 38, and therefore, to and through conduit means 31 of the housing 13. The plate member 36 is fixedly mounted on a shaft 39 which extends to the exterior of the chamber 35; and a control handle 40 for movement by an operator is fixed to the external projection of the shaft 39.

A critical feature of the invention is that the stationary housing must include at least one hydraulic conduit means 31 extending therethrough, as aforenoted. One such conduit connection to a hydraulic chamber 23 (or to two chambers 23 and 24) of the master structure 11 is sufficient to permit hydraulic fluid to be forced into such hydraulic chamber to effect coupling between the base annular structure 11 and rotatable secondary structure 12. Withdrawing hydraulic fluid from such hydraulic chamber (23, 24) through conduit means 31 does create a vacuum condition, or pulling condition, upon the hydraulically-responsive means within the hydraulic chamber. This suction effect is sometimes sufficiently effective to withdraw the hydraulically-responsive means (25, 26) and effect unlocking of the coupling means (27, 28), particularly where the sealed nature of the hydraulic passage system for a single conduit hydraulic control is near perfect, or where the sensitivity of the hydraulically-responsive member is high (and preferably where seal means such as O-rings 76 and 77 are omitted so as to allow environmental fluid such as air or water to relieve a "vacuum" condition at side 46, 47 of the hydraulically-responsive member 25,26 in devices lacking auxiliary conduits 44, 45).

However, more positive control of coupling means (pin 27 or 28) is possible when a secondary hydraulic conduit means 41 extends through the stationary housing 13, and when the second conduit means 41 is in sealed communication with an auxiliary hydraulic conduit 42 (or passages 42, 43) of the master rotatable structure (that is, the base structure 11). The auxiliary passage 42, 43 extends as a continuation passage 44, 45 in communication with the side 46, 47 of that hydraulically-responsive means 25, 26 opposite that of the wall 91, 92 in communication with the hydraulic chamber 23, 24. The second conduit means 41 of the housing 13 is connected through flexible hose 48 to a right ventrical or alternate chamber 49 of the switch means 33. Thus, movement of the hydraulically-responsive pistons 25 and 26 can be positively effected in either direction within the hydraulic cylinder 23, 24 by both hydraulic pressure forces and hydraulic withdrawal or vacuum forces during rotation of the rotatable structures. The positive shifting of the hydraulically-responsive piston 25, 26 effects positive action of either coupling or uncoupling.

The rotatable secondary structure 12, in the nature of a hub member 21 with propeller fins 22 projecting radially therefrom, is illustratively mounted on the sleeve member 15 of the base annular structure 11 through ball bearings 50 and 51. The inner races 52 and 53 of each ball bearing suitably are snugly and immovably fixed annularly upon sleeve 15 for rotation with sleeve 15. The outer races 54 and 55 are snugly or immoveably fixed to an interior annular groove or recess within the hub 21 of the secondary structure 12. Annular shoulders or ridges may be employed to assist in the mounting and holding of the ball bearings in proper position. For example, the inner race 52 of bearing 50 may be given a tight immoveable fit on sleeve 15 against shoulder 56 on sleeve 15. The outer race 55 of bearing 51 may be locked or fixed in position between shoulder 57 of an annular recess in hub 21 and the body of coupling block 29. This annular block or plate 29, suitably of tempered steel or other wear and shatter resistant material, is equipped with recesses 58 for coupling pins 27 and 28 to enter for interlocking of the secondary structure 12 to the base annular structure 11. Coupling block 29 is permanently fixed as by bolts 30 onto the body of the hub 21 of the secondary structure 12. Block 29 should snugly fit into hub body 21, or a gasket to seal out water access to the bearings should be used. In order to keep water from entering and fouling the lubrication of the ball bearings 50 and 51 or other thrust bearings on which the secondary structure 12 is mounted for optional rotation with the base structure, seals such as O-ring seals 60 and 61 may be employed near longitudinal termination interfaces between the sleeve member 15 of the base annular structure 11 and the mass of the total secondary structure 12.

For convenience of manufacture, the master structure or base annular structure 11 is made up of several parts which are independently fabricated and then secured together. Of course, one might manufacture the entire master structure as a single unit; but this would usually necessitate either an extremely small hydraulic chamber means 23 and 24 for movement of the hydraulically-responsive pistons 25 and 26, or a relatively large port opening from the master structure (e.g., the base annular structure 11) to the communication with the hydraulic means of the stationary housing. Indeed, the port opening from the master structure might have to be equal in size and cross-sectional shape to the cross-section of a large piston chamber. It is, however, preferable that the port opening at the interface or communication between the rotary master structure 11 and the stationary housing 13 be no larger than necessary for adequate flow of hydraulic fluid and adequate transfer of hydraulic fluid between the parts. Thus, an adaptor fitting 20 offers a convenient alternate, from a practical manufacturing standpoint, to the less preferred options just aforenoted.

Figure 4:
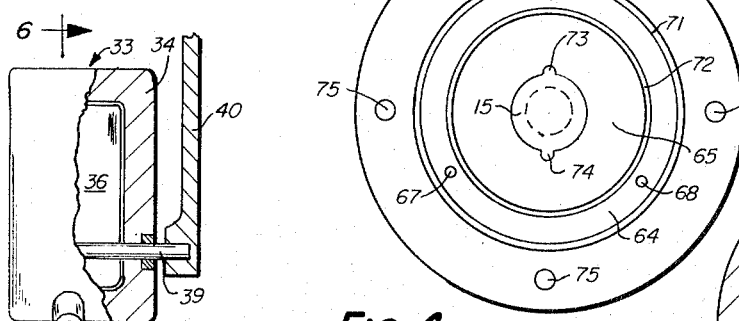
FIG. 4 is a schematic end view of an adaptor fitting for the mechanism hereof, the showing in the Figure being that which one would gain by looking at the adaptor fitting at approximately line 4—4 of FIG. 1 after removal of the stationary housing from the device shown in FIG. 1.

Adaptor fitting 20 (see FIGS. 1 and 4) is equipped with two stepped annular recesses 62 and 63, both of which are radially inward or near the axis of rotation for the adaptor. The annular shoulder 64 of the first or outer annular recess 62 is radially outward from the annular shoulder 65 of the inner-most or second annular recess 63. Hydraulic passages or ports 66, 67, and 68 extend from the shoulder 64 (at the outer annular recess 62) through the adaptor fitting 20 to an annular groove 69 (see FIGS. 1 and 3) on the opposite side of the adaptor fitting 20. This annular groove 69 is illustrated to be in direct communication with the chamber means 23 (or several chamber means such as 23 and 24) of the master structure 11 at all times. Further (see FIGS. 1 and 4), the adaptor passages 66, 67 and 68 are in communication with the exit 32 of the hydraulic conduit 31 of the stationary housing 13. The space between shoulder 64 of adaptor recess 62 and the radial edge of the annular projecting ridge 70 of the stationary housing 13 preferably is sufficiently great to permit flow of hydraulic fluid between conduit 31 of housing 13 and adaptor passages 66, 67 and 68 under all conditions of relative orientation between the parts. Seals such as O-ring seals 71 and 72 confine hydraulic fluid of conduit 31 of the stationary housing 13 to the passages 66, 67 and 68 of the adaptor 20, and therefore to the hydraulic chamber means 23 and 24.

The shoulder 65 of the inner-most annular recess 63 of the adaptor 20 (or the inner annulus of the adaptor 20) is equipped with a conduit passage for hydraulic fluid; and this passage is identified herein as an auxiliary conduit passage. It may be formed simply by providing an enlarged space or groove axially along the interior ring or annulus of the adaptor 20 through which the sleeve member 15 of the base annular structure 11 extends. The auxiliary conduit passage 73 (or passages 73 and 74) of the adaptor fitting 20 is in communication with auxiliary conduit passage 42 (or passages 42 and 43) of the body 18 of the master or base annular structure 11. Therefore, the auxiliary conduit passage (42 and 73; 43 and 74) communicates with the side of the hydraulically-responsive means or piston (27 and 28) opposite to that of the wall (91 and 92) thereof in communication with the hydraulic chamber means (23 and 24).

The parts of the base annular structure, such as the sleeve 15, the hub body 18, and the adaptor fitting 20 are all fixedly secured together against rotation with respect to each other. They rotate as a unit. The hub body 18 may be fitted so snugly on sleeve 15 as to be non-rotatable with respect thereto; it may be fitted on the sleeve by splined interconnection. The adaptor fitting 20 is suitably ridgedly fixed to the hub body by screws 75 or the like.

To prevent water or other fouling material from entering the hydraulic system along the shaft of coupling pins 27 and 28, O-rings 76 and 77 or other sealing means may be employed. O-ring 71 at the outer extremity of the annular recess 62 of adaptor 20 likewise serves a sealing function.

Gaskets 78 and 79 may be employed as sealing means at the interface between the adaptor 20 and the hub body 18 of structure 11. They prevent escape of hydraulic fluid and separate or prevent intercommunication between auxiliary conduit passages (42 and 73; 43 and 74) and the main hydraulic chamber area (23 and 24), or vice versa. Further, O-ring seals 80 and 81 are employed about hydraulic pistons 25 and 26 to prevent leakage or passage of hydraulic fluid.

The non-rotating stationary housing 13 suitably comprises an annular housing about sleeve 15 of the base annular structure 11, with two stepped axially-projecting annular ridges 70 and 82 mating into the two stepped recesses 62 and 63 of the adaptor 20. The first or outer annular ridge 70 which projects axially from the body 83 of the stationary housing 13 has been identified as the ridge or projecting shoulder through which the main hydraulic conduit passage 31 and 32 of the stationary housing interconnects to the passages 66, 67 and 68 at the shoulder 64 of the first recess 62 of adaptor 20.

The second (or axially inner and more pronounced annular ridge 82 off the body 83 of housing 13 serves as a holder for an axially-encompassing roller bearing 84, which serves both as a spacer for the stationary housing 13 about sleeve 15 of the base annular structure 11 and as a means to permit free rotation of the sleeve 15 without effecting rotation of the encompassing stationary housing 13. Still further, the rollers of the roller bearing 84 leave sufficient space therebetween so that hydraulic fluid from auxiliary conduit passages 73 and 74 may flow through the roller bearing 84 and lubricate the same as well as pass into a continuation of the grooved auxiliary conduit passage (identified as passages 85 and 86) in the stationary housing. Axial grooved passages 85 and 86 are connected together by an internal annular axially-encompassing passage or groove within housing 13, and then communicate with the second or auxiliary conduit passage 41 of housing 13. An O-ring seal 87 or other suitable seal serves to prevent hydraulic fluid from exiting from the space between the body 83 of stationary housing 13 and the sleeve 15 at the substantial end or axial terminus of the unit.

The assembly of the power transmitting mechanism on a water craft power shaft 14 is relatively simple. First, the propeller hub originally mounted on the shaft is removed. Next, an annular fitting (such as a bevel threaded nut 88, with an O-ring or other axially-projecting abutting 89 member for low-friction contact against housing 13, plus a beveled annular ring of deformable friction packing 90) is pressed or slid along shaft 14. Then, the stationary housing 13 is placed on the shaft, suitably as a separate step from fitting of the remaining elements of the power transmitting mechanism of the shaft. Stationary housing 13 is pushed back on the power shaft 14 beyond the location it will assume after fitting the mechanism for operation on that shaft. Then, the remaining elements of the power transmitting mechanism, as a unit, are fitted on the shaft, with the sleeve 15 preferably having a rather snug fitting on the shaft. Shear pin 16 is then put in place (or sleeve 15 is slotted to accept an embedded one). The nut cap 17 may also be put in place at this point.

Thereafter, the stationary housing 13 is moved to place it in the position as illustrated in FIG. 1, radially contiguous to the sleeve 15 of the base annular structure 11 and with the annular projecting ridges 70 and 82 of the stationary housing 13 inserted in the annular recesses 62 and 63 of the adaptor 20. Then, the abutting ring assembly 88 and 89 is threadedly impacted upon friction packing material 90, which grips the power shaft 14 for common rotation of the ring assembly 88 and 89 with shaft 14. Annular abutting member 89 rests in abutting relationship against the body 83 of stationary housing 13. Its function is to hold stationary housing in the axial position illustrated in FIG. 1 during rotation of all parts except housing 13. To be recognized, however, is that the spacing of the stationary housing from the rotatable base annular structure 11 (that is, the adaptor 20 thereof) may vary without loss of operability for the device, so long as the annular axially projecting ridges 70 and 82 of the stationary housing are within the effective range of operation for the O-ring seals 71 and 72. In the just noted arrangement, employing packing assembly 88, 89 and 90, one may avoid bolting or otherwise mechanically fixing housing 13 to a non-rotating part of the power plant or water craft equipped with the new mechanism. The flexible hydraulic lines or hoses connected to the stationary housing may alone serve to keep that housing 13 in a substantially non-rotating condition as other parts rotate.

Alternately, the stationary housing may be braced or bolted to a frame member of the water craft or the motor thereof to hold it in the position illustrated in FIG. 1. In this way, the special fitting 88, 89 and 90 on power shaft 14 may be omitted.

Flexible conduits 38 and 48 are affixed between housing 13 and control mechanism 33, with the later mounted at any suitably position within the water craft.

As the handle of the control switch 33 is shifted to the left in FIG. 6, hydraulic fluid is forced through flexible conduit 38 into conduit 31 of the stationary housing 13 and into hydraulic chambers 23 and 24 of the base annular structure 11, thereby pressing the hydraulically-responsive pistons 25 and 26 to the left in FIG. 1 and forcing the pin coupling means 27 and 28 into the recesses 58 and 59 of the secondary structure 12 to effect common rotation of the secondary structure 12 with the base annular structure 11. This interlocking of the base structure 11 to the secondary structure 12 may be accomplished during continuous rotation of the base structure 11, preferably while at a lower (or at least not the maximum) rate of rotation for the base structure 11.

Movement of the handle 40 of the control switch means 33 to the right in FIG. 6 withdraws hydraulic fluid from chamber means 23 and 24 through the main conduit means 66, 32, 31, and 38 into the left side 35 of the switch chamber as viewed in FIG. 6; and simultaneously, this action presses hydraulic fluid out of the right side 49 of the switch housing in FIG. 6 into the auxiliary or secondary passage 48 and 41, through the auxiliary passages (85, 73, 42, 44 and 86, 74, 43, 45) to a position on the opposite side or behind the hydraulically-responsive means 25 and 26. The result is positive movement of responsive means 25 and 26 to the right in FIG. 1, and the unlocking of coupling means 27 and 28 from recesses 58 and 59 of the secondary structure 12. Reverse movement of handle 40 of switch 33, of course, effects reverse movement of hydraulic fluid and the interlocking of coupling means 27 and 28 with secondary structure 12.

Many variations from the specific arrangement illustrated are possible. Coupling means 27 and 28 might be provided with beveled or pointed end surfaces and recesses 58 and 59 adjusted in shape for accommodation of the modified couplers 27 and 28. Propeller projections from the hub of the base annular structure 11 may be omitted or may be insufficient to effect any great forward thrust as that part rotates in water, whereas the size and contour of the propeller fins of the secondary structure 12 may effectively generate considerable thrust at the same rate of rotation. Means between the secondary structure 12 on sleeve member 15 of a base annular structure 11 may permit substantially no rotation (or only idler rotation, as characteristic of the illustrated embodiment) of the hub 21 of the secondary structure 12 when it is not interlocked as aforenoted with the base annular structure 11. Or such means may cause a slow positive, but graduated down, degree of rotation for the secondary structure 12 even when it is not per se interlocked as aforenoted with the base annular structure for common rotation. Thus, the secondary structure may be adjustably geared to the base structure for rotation at a reduced speed at all times, and thereby serve as the propelling force for extremely slow speeds (below that customary for a predetermined rate of rotation for power shaft 14); and it may also serve, after the aforediscussed interlocking, as the propelling force for higher speeds associated with a rate of rotation common (that is, the same r.p.m.) to that of the power shaft 14. Still other modifications and additions to the teachings hereof may be employed without departing from the essential features of the invention.

That which is claimed is:

1. A power transmitting mechanism for mounting on a powered rotatable axis shaft, said mechanism comprising:

i. a rotatable base annular structure having an axiis of rotation, said base structure comprising a sleeve part annularly encompassing said axis of rotation, said sleeve part being adapted to be fitted to a powered rotatable axis shaft for continuous rotation of said base structure with said shaft, with the power for effecting rotation of said base structure being transmitted from said powered axis shaft to said base structure, ii. a rotatable secondary structure contiguous to said base structure and annularly encompassing said axis of rotation, at least a portion of said secondary structure being radially contiguous to a portion of said sleeve part of said base structure, said secondary structure being optionally rotatable in common with said base structure, iii. one of said structures being a master structure including hydraulic chamber means, hydraulically-responsive means having a wall in communication with said chamber means, and coupling means actuated by said hydraulically-responsive means, said coupling means being actuatable during continuous rotation of said base structure to interlock said secondary structure to said base structure for common rotation with said base structure, and being actuatable during said continuous rotation of said base structure to disengage said secondary structure from the aforesaid interlocked condition, and iv. a non-rotating stationary housing contiguous to at least one of said structures and annularly encompassing said axis of rotation, said stationary housing including hydraulic conduit means extending therethrough, one end of said conduit means being in sealed communication with said hydraulic chamber means of said master structure to permit transfer of hydraulic fluid through said conduit means to or from said chamber means during rotation of either or both of said rotatable structures, said sealed communication between said one end of said hydraulic conduit means of said stationary housing and said hydraulic chamber means of said master structure being radially outward from any axis shaft upon which said base annular structure is fitted.

2. The mechanism of claim 1 additionally including a hydraulic control switch means for moving hydraulic fluid through said conduit means of said stationary housing to or from said chamber means.

3. The mechanism of claim 2 additionally including a flexible hydraulic conduit connection between said control switch means and said conduit means of said stationary housing.

4. The mechanism of claim 1 wherein said master structure comprises said base annular structure.

5. The mechanism of claim 1 wherein said hydraulically-responsive means comprises a piston member.

6. The mechanism of claim 1 wherein said coupling means comprises a pin member.

7. The mechanism of claim 1 wherein said secondary structure comprises a hub member with propeller fins projecting radially therefrom.

8. The mechanism of claim 1 wherein said base annular structure comprises a hub member with propeller fins projecting radially therefrom.

9. The mechanism of claim 1 wherein said sleeve part of said base annular structure is adapted to be snugly fitted over the propeller power shaft of an outboard motor, and wherein said stationary housing is contiguous radially to a portion of said sleeve part for at least a portion of said stationary housing.

10. The mechanism of claim 1 wherein said stationary housing includes a second hydraulic conduit means extending therethrough and where said master structure includes auxiliary conduit passage for hydraulic fluid on the side of said hydraulically-responsive means opposite to that of the wall thereof in communication with said chamber means, with said second hydraulic conduit means in sealed communication with said auxiliary conduit passage to permit transfer of hydraulic fluid through said second hydraulic conduit means to or from said opposite side of said hydraulically-responsive means during rotation of either or both said rotatable structures.

11. The mechanism of claim 1 wherein at least said one end of said hydraulic conduit means of said stationary housing is located radially outward from a portion of said base annular structure.

* * * * *

UNITED STATES PATENT OFFICE
CERTIFICATE OF CORRECTION

Patent No. 3,796,514　　　　　　　　Dated March 12, 1974

Inventor(s) CLEMENT O. DU FRENE

It is certified that error appears in the above-identified patent and that said Letters Patent are hereby corrected as shown below:

Column 5, line 7, "annular" should read -- annularly --

Column 10, line 44, "axiis" should read -- axis --.

Signed and sealed this 13th of August 1974.

(SEAL)
Attest:

McCOY M. GIBSON, JR.　　　　　　　　C. MARSHALL DANN
Attesting Officer　　　　　　　　　　Commissioner of Patents